United States Patent
Ochiai et al.

(10) Patent No.: US 7,918,460 B2
(45) Date of Patent: Apr. 5, 2011

(54) ROTATING MEMBER AND METHOD FOR COATING THE SAME

(75) Inventors: Hiroyuki Ochiai, Tokyo (JP); Mitsutoshi Watanabe, Tokyo (JP); Akihiro Goto, Tokyo (JP); Masao Akiyoshi, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 12/425,717

(22) Filed: Apr. 17, 2009

(65) Prior Publication Data

US 2009/0200748 A1    Aug. 13, 2009

Related U.S. Application Data

(60) Division of application No. 10/976,215, filed on Oct. 29, 2004, now Pat. No. 7,537,809, which is a continuation-in-part of application No. PCT/JP03/12945, filed on Oct. 9, 2003.

(30) Foreign Application Priority Data

| Oct. 9, 2002 | (JP) | .................. 2002-295964 |
| Oct. 9, 2002 | (JP) | .................. 2002-295966 |
| Jun. 11, 2003 | (JP) | .................. 2003-167075 |

(51) Int. Cl.
*F16J 15/447* (2006.01)
(52) U.S. Cl. ................................................ 277/412
(58) Field of Classification Search .......... 277/411–412, 277/415, 414
See application file for complete search history.

(56) References Cited

U.S. PATENT DOCUMENTS

| 3,444,058 A | * | 5/1969 | Senderoff et al. ............. 205/358 |
| 3,444,059 A | | 5/1969 | Throop |
| 3,552,479 A | | 1/1971 | Hockin |
| 3,660,882 A | | 5/1972 | Widowitz et al. |
| 3,754,899 A | | 8/1973 | Kanter |
| 3,778,586 A | | 12/1973 | Breton et al. |
| 3,961,910 A | | 6/1976 | Baladjanian et al. |
| 4,735,656 A | * | 4/1988 | Schaefer et al. ................ 75/238 |
| 4,744,725 A | | 5/1988 | Matarese et al. |
| 4,802,828 A | * | 2/1989 | Rutz et al. ................. 416/241 B |
| 4,818,388 A | | 4/1989 | Morioka et al. |
| 4,851,188 A | * | 7/1989 | Schaefer et al. .................. 419/9 |
| 4,878,953 A | | 11/1989 | Saltzman et al. |
| 5,074,970 A | * | 12/1991 | Routsis et al. ................. 205/122 |

(Continued)

FOREIGN PATENT DOCUMENTS

JP    61-17904    5/1986

(Continued)

OTHER PUBLICATIONS

J. Grant, editor, "Hackh's Chemical Dictionary", third edition, McGraw-Hill Book Co., Inc.; New York, USA; 1944 (no month), excerpt p. 169.

(Continued)

*Primary Examiner* — Vishal Patel
(74) *Attorney, Agent, or Firm* — Griffin & Szipl, P.C.

(57) ABSTRACT

A pulsed discharge is generated between tip ends of a rotating member such as a blade and a discharge electrode including a hard material such as cBN in dielectric liquid or gas by a power supply for discharge to melt the discharge electrode, and a part of the discharge electrode is attached to the tip end of the rotating member to form an abrasive coating film including the hard materials such as cBN.

3 Claims, 9 Drawing Sheets

U.S. PATENT DOCUMENTS

| | | | |
|---|---|---|---|
| 5,134,032 A | | 7/1992 | Cooper et al. |
| 5,264,011 A | | 11/1993 | Brown et al. |
| 5,314,304 A | * | 5/1994 | Wiebe .................. 415/173.4 |
| 5,485,890 A | * | 1/1996 | Cawthorne et al. ............ 175/228 |
| 5,603,603 A | * | 2/1997 | Benoit et al. ............... 415/173.4 |
| 5,804,789 A | | 9/1998 | Saito et al. |
| 5,858,479 A | | 1/1999 | Saito et al. |
| 5,866,518 A | * | 2/1999 | Dellacorte et al. ............ 508/104 |
| 5,935,407 A | | 8/1999 | Nenov et al. |
| 5,952,110 A | * | 9/1999 | Schell et al. ................. 428/621 |
| 6,086,684 A | | 7/2000 | Saito et al. |
| 6,348,668 B1 | | 2/2002 | Moro et al. |
| 6,365,008 B1 | | 4/2002 | Goto et al. |
| 6,437,278 B1 | | 8/2002 | Inoue et al. |
| 6,492,611 B2 | | 12/2002 | Goto et al. |
| 6,548,028 B1 | | 4/2003 | Yuzawa et al. |
| 6,602,561 B1 | | 8/2003 | Moro et al. |
| 6,793,982 B1 | | 9/2004 | Yamada et al. |
| 6,808,604 B1 | | 10/2004 | Goto et al. |
| 6,821,579 B2 | | 11/2004 | Yuzawa et al. |
| 6,929,829 B2 | | 8/2005 | Mohri et al. |
| 6,935,917 B1 | | 8/2005 | Goto et al. |
| 7,537,809 B2 | | 5/2009 | Ochiai et al. |
| 2001/0014405 A1 | | 8/2001 | Yuzawa et al. |
| 2002/0147521 A1 | | 10/2002 | Mok et al. |
| 2004/0064945 A1 | | 4/2004 | Howley |

FOREIGN PATENT DOCUMENTS

| | | |
|---|---|---|
| JP | 61-246301 | 11/1986 |
| JP | 03-066520 | 3/1991 |
| JP | 05-148615 | 6/1993 |
| JP | 07-197275 | 8/1995 |
| JP | 07-301103 | 11/1995 |
| JP | 08-053777 | 2/1996 |
| JP | 08-081756 | 3/1996 |
| JP | 08-319804 | 12/1996 |
| JP | 8-327263 | 12/1996 |
| JP | 09-192937 | 7/1997 |
| JP | 11-286768 | 10/1999 |
| JP | 11-320272 | 11/1999 |
| JP | 2000-345367 A | 12/2000 |
| JP | 2000-345809 | 12/2000 |
| JP | 2001-152803 | 6/2001 |
| JP | 33227454 | 8/2001 |
| JP | 2001-279165 | 10/2001 |
| WO | 99/58744 | 11/1999 |
| WO | 00/29154 | 5/2000 |
| WO | 00/29157 | 5/2000 |
| WO | 2004/033755 A1 | 4/2004 |

OTHER PUBLICATIONS

Abstract of JP 61-246301 by Tominaga et al., "Production of Corrosion and Wear-Resistant Sliding Material."

Random House Webster's College Dictionary (1991), p. 609 & 996.

Office action from foreign office is not a proper document for form 1449.

Office Action for application and search report or office actions from foreign countries are not proper documents for form 1449. References should be listed on 1449.

Exhibit A1, contents of www.chemistryexplained.com/elements/A-C/Chromium.html, downloaded May 24, 2010.

Exhibit A2, "Preliminary Evaluation of PS300: A New Self-Lubricating . . ." NASA TM 107056.

Exhibit A3, contents of U.S. Patent No. 5,866,518 issued to Dellacorte et al.

Exhibit A4, the contents of of www.juntsu.co.jp/qa/qa0914.html, downloaded May 23, 2010.

Exhibit A5, an english translation obtained from Google of a portion of Exhibit A4.

* cited by examiner

TURBINE BLADE

TURBINE BLADE

COMPRESSOR BLADE

CERAMIC LAYER ON POROUS LAYER

TURBINE BLADE 20

ADVANCE DIRECTION

1

NO COATING ON OPPOSITE SURFACE IN THIN BLADE

NO COATING ON TIP END

TURBINE BLADE

ADVANCE DIRECTION

NO COATING ON OPPOSITE SURFACE IN SMALL BLADE

NO COATING ON TIP END

ROTATING MEMBER AND METHOD FOR COATING THE SAME

This application is a Divisional Application of U.S. patent application Ser. No. 10/976,215 (now U.S. Pat. No. 7,537,809), which is a Continuation-in-Part of International Application No. PCT/JP03/12945, filed Oct. 9, 2003, which claims priority on Japanese Patent Application No. 295964/2002, filed Oct. 9, 2002, and Japanese Patent Application No. 295966/2002, filed Oct. 9, 2002, and Japanese Patent Application No. 167075/2003, filed Jun. 11, 2003. The entire disclosures of the above patent applications are hereby incorporated by reference.

BACKGROUND OF THE INVENTION

1. Technical Field of the Invention

The present invention relates to a rotating/rotatable member such as a blade or labyrinth seal for use in a gas turbine, steam turbine, compressor or the like, and a method for coating the rotating/rotatable member. More particularly, it relates to a rotating/rotatable member on a part of which a coating film including a hard material is formed, and a method for coating the rotating/rotatable member.

2. Description of the Related Art

For a rotating/rotatable member such as a blade or a labyrinth seal, a clearance between a rotating section and a stationary section, such as a chip clearance between the blade and a casing or a shroud, or a seal clearance between the labyrinth seal and a honeycomb seal, needs to be kept/set to be appropriate during operation of a gas turbine. When the clearance is set to be excessively large to avoid, efficiency of the gas turbine drops. Conversely, when the clearance is set to be excessively small, a tip end of the rotating member breaks and causes trouble for the gas turbine.

Therefore, in consideration of contact of the rotating member with surrounding members (casing, shroud, honeycomb seal, and the like), a tip end of a blade or of a labyrinth seal is coated with an abrasive coating of a relatively hard material for chipping off the material of a contact surface of the surrounding member. The surrounding member is coated with an abradable coating of a material, which is relatively easily chipped. Accordingly, chip clearance or seal clearance is adjusted so as to be minimized so that a side of the surrounding member is chipped off by the tip end of the rotating member when driving the gas turbine thereby taking advantage of a hardness difference of the coatings.

In this case, FIG. 1A is a perspective view of a usual turbine blade, FIG. 1B is a perspective view of the turbine blade with a chip shroud, and FIG. 1C is a perspective view of a compressor blade. It is to be noted that a platform or a dovetail on a turbine disk side is omitted from these figures. In a turbine blade 1, shown in FIG. 1A, the whole surface of a blade tip end is coated with an abrasive coating 5a. In a turbine blade 2 provided with a chip shroud 3, shown in FIG. 1B, the whole surfaces of the tip ends of chip fins 4 disposed on a chip shroud 3 (i.e., the tip ends of the turbine blade) are coated with abrasive coatings 5b. Furthermore, for the blade 1 of the compressor, shown in FIG. 1C, an abrasive coating 5c is applied over the region of the blade tip end (including the backside of the figure).

Moreover, FIG. 2 is a sectional view showing one example of a labyrinth seal tip end. The labyrinth seal is disposed in the clearance between a rotating section and a stationary section to prevent leakage of air or combustion gas, and is a seal structure frequently used in a gas turbine and compressor. In general, an annular labyrinth seal 6 including concave/convex portion is disposed on a rotating section side, and a honeycomb seal (not shown) including a structure easy to be chipped off is disposed on a stationary section side. FIG. 2 illustrates a sectional view cut in a plane including a center axis of the labyrinth seal 6, and an abrasive coating 5d is applied to the tip end of the convex portion of the labyrinth seal 6.

These abrasive coatings have heretofore been applied by methods such as welding, thermal spraying, and plating (e.g., see References 1 and 2). With respect to coating by welding, a welding rod or a powder body is used to coat predetermined portions, such as the tip end of the turbine blade or the labyrinth seal. With respect to coating by thermal spraying, zirconia is thermally sprayed, which has a small difference in thermal expansion from a mother material and whose hardness is relatively high (Vickers hardness of 1300 HV). With respect to coating by plating, abrasive grains (Vickers hardness of 4500 HV) of cubic boron nitride (cBN), which are high in hardness, are electrically attached by nickel plating.

It is to be noted that other prior art methods related to the present invention are described in References 3, 4.

[Reference 1]
Japanese Laid-Open Patent Publication No. 11-286768.
[Reference 2]
Japanese Laid-Open Patent Publication No. 2000-345809.
[Reference 3]
Japanese Laid-Open Patent Publication No. 7-301103.
[Reference 4]
Japanese Laid-Open Patent Publication No. 8-319804.

However, in the above-described methods, a portion that does not have to be coated is masked in order to closely attach the abrasive coating, and the surface to be coated needs to be blast-treated in order to enhance adhesion, and there are problems in that there many pretreatments are required and costs are high. In either conventional thermal spraying or plating methods, there have been problems in that the adhesion of the coating is bad, peeling occurs at the time of driving the apparatus, engine trouble is caused, and additionally the chip clearance or the seal clearance is not maintained appropriately. Furthermore, there is a problem in that, with respect to coating by welding, only a metal much lower in hardness can be coated as compared to when a ceramic is used, and, therefore, abrasive properties (which are properties for chipping off a material to be ground) are inferior. Moreover, there is a problem in that the quality level of the coating fluctuates based on the operator's expertise, and a welding crack may easily occur when employing a material poor in thermal conductivity and having small elongation properties. Furthermore, there has been a problem encountered in that posttreatments are required, such as processing grinding to a required dimension after welding so that a lot of trouble is required.

Moreover, according to References 3 and 4, in the coating method, discharge is performed between the rotating member and an electrode on first discharge conditions so that the electrode is consumed, and the electrode is formed in accordance with the shape of a coating film forming portion. Thereafter, the coating film is formed by discharge between the electrode and the rotating member on second discharge conditions. Then, even when the electrode is not processed beforehand for a product shape, a coating object portion can still be appropriately coated. On the first discharge conditions for consuming the electrode, the electrode is set to have a minus polarity, a pulse width is set to 1 μs or less, and a current value is set to 10 A or less. On the second discharge conditions for forming the coating film, the electrode is preferably set to have minus polarity, the pulse width is set to be 2 to 10 µs, and the current value is set to be 5 to 20 A.

Moreover, in accordance with conventional abrasive coating, because the whole area of the tip end of the blade is coated, there has been a problem encountered in that the coating range is broad and the yield of products is poor.

Furthermore, heretofore, coating has been performed by plating or by thermal spraying. Therefore, during production (manufacturing) of the labyrinth seal, coating pretreatments, such as a blast process and a process of attaching a masking tape, are required before coating is performed, and coating post-treatments, such as a process of removing the masking tape, are required after coating is performed. Therefore, the operation time required for the production (manufacturing) of the labyrinth seal lengthens, and, therefore, it is not easy to improve productivity of the labyrinth seal.

Additionally, for the same reason, the abrasive coat cannot be firmly attached to the tip edge of a seal fin. Therefore, a problem has been encountered in that the abrasive coat easily peels off the tip edge of the seal fin and the quality of the labyrinth seal is not stable.

SUMMARY OF THE INVENTION

The present invention has been developed to solve the above-described various problems. In particular, a first object of the present invention is to provide a rotating/rotatable member that does not require any pretreatment or post-treatment, and which has good adhesion, and which is coated with a precise abrasive coating of a relatively hard material (hereinafter, referred to as a "hard material" in the present specification for the sake of convenience) compared to the material of an opponent component that contacts with the rotating/rotatable member during rotation. In accordance with the first object of the present invention, a method for coating the rotating/rotatable member is also provided. Moreover, the first object of the invention is also to provide a method for forming a long-service-life coating in tests of high cycle fatigue (HCF) or low cycle fatigue (LCF) for an abrasive coated component.

Furthermore, a second object of the present invention is to provide a rotating/rotatable member wherein the area of coating of the hard material is optimized to enhance the yield and to provide a method for coating the rotating member in accordance with the second object of the present invention.

Additionally, a third object of the present invention is to provide a rotating/rotatable member in which the operation time required for production of a labyrinth seal is reduced and in which productivity of labyrinth components can be improved. In accordance with the third object of the present invention, a method for coating the rotating/rotatable member is provided.

To achieve the first object, according to a first invention, there is provided a method for coating a rotating/rotatable member, comprising the steps of: generating a pulsed discharge between a rotating/rotatable member formed into a predetermined shape and a discharge electrode of a green compact in dielectric liquid or gas to transfer a hard material of the discharge electrode or a hard material changed from a material of the discharge electrode onto the rotating/rotatable member by each discharge pulse so that a hard concavity and convexity is formed on the rotating/rotatable member, wherein the green compact includes the hard material or the material changing into the hard material by the discharge; and repeatedly generating the discharge pulse to form on the rotating/rotatable member a hard coating film having concavity and convexity.

Moreover, according to a second invention, in the method for coating the rotating/rotatable member, the hard coating film is an abrasive coating film that is formed on a part of the rotating/rotatable member and that rubs against and shaves an opponent component.

According to the first and second inventions, because the so-called "discharge coating method" is used, pretreatments such as masking and blast treatment or post-treatments such as grinding are not necessary. Furthermore, the coating film or a layer having good adhesion can be formed and used as a coating, and the coating film contains remarkably hard materials such as a cubic boron nitride (cBN), and a hard coating film and a coating film having good abrasive properties can be formed. Abrasive properties of the coating are improved by treatment on a condition for forming a coating having a coarse surface.

Moreover, according to a third invention, the method comprises the steps of: generating a discharge between the rotating/rotatable member and the discharge electrode on a first discharge condition on which the discharge electrode is consumed so that the shape of the discharge electrode is made to conform to the shape of the coating film forming portion on the rotating/rotatable member; and, thereafter generating a discharge between the discharge electrode and the rotating/rotatable member on a second discharge condition to form the coating film on the rotating/rotatable member.

Furthermore, according to a fourth invention, preferably, on the first discharge condition, the discharge electrode has a minus polarity, a pulse width of 1 µs or less, and a current value of 10 A or less, and on the second discharge condition, the discharge electrode has a minus polarity, the pulse width is 2 to 10 µs, and the current value is 5 to 20 A. Additionally, the coating film is preferably formed on the tip end of the rotating/rotatable member. Furthermore, for the hard member, as in an eighth invention, the discharge electrode of the green compact contains one of, or a mixture, of cBN, TiC, TiN, TiAlN, TiB$_2$, WC, Cr$_3$C$_2$, SiC, ZrC, VC, B$_4$C, Si$_3$N$_4$, ZrO$_2$—Y, and Al$_2$O$_3$. Moreover, the material forming the hard member by the discharge is preferably one of, or a mixture of, Ti, Cr, W, V, Zr, Si, Mo, and Nb, and these materials are formed into carbide by the discharge in an oil in order to form a hard coating film. Because a so-called "discharge coating method" is used according to this method, the tip end of the rotating/rotatable member can easily be coated with the hard material. From the viewpoint of resistance to oxidation, a coating film containing TiC, WC, or cBN is preferably formed on the rotating/rotatable member that is driven at a low temperature, and a coating film containing cBN or Cr$_3$C$_2$ is used in the rotating member that is driven at a high temperature, and a coating film containing ZrO$_2$—Y or Al$_2$O$_3$ is formed on the rotating/rotatable member that is driven at an even further higher temperature.

According to a fifth, sixth, seventh, and ninth inventions, there is provided a method of enhancing fatigue strength of a coated surface. A coating film that does not easily stretch, as compared with a mother material, is formed on the surface. Then, because a thin coating film bears a tensile load, the coating film on the surface cracks easily. When coating by a discharge surface treatment, because the hard layer is firmly welded to the mother material, cracking of the coating film develops into that of the mother material. To avoid this cracking, it is necessary to form a coating film having ductility, or to form a layer for preventing the development of cracks between the mother material and the coating film, or to form a coating layer that is strong against pull forces.

In accordance with a fifth invention, in the coating film, a ratio of a coated area coated with the hard material in a coating film forming portion to a portion not coated with the hard material in the coating film forming portion is such that coverage is suppressed, wherein the not coated providing ductility is scattered and left in the coated area (FIG. 4), and thereby ductility is provided for the coating film.

In a sixth invention, the discharge electrode is made to contain a metal that does not easily form carbide.

Accordingly, a portion of the metal that does not easily form carbide is scattered in the coating film and has ductility, and by forming a portion between the hard materials ductility is provided to the coating film.

In accordance with a seventh invention, a porous coating film, mainly formed of a metal, is formed as a base. Thereafter, since the coating film containing the hard material is formed on the porous coating film, cracking of the coating layer is prevented from developing into cracking into the mother material.

In accordance with a ninth invention, the surface of the coating layer is peened, and residual stress of compression persists after peening. Thus, even when the mother material stretches, tensile stress is reduced.

These fifth to seventh, and ninth inventions are effective not only for forming a coating with hard material but also for the discharge surface treatment for forming the coating film on the surface, such as when forming a wear-resistant coating.

Moreover, according to the eighth invention, because a remarkably hard ceramic, usable in the coating of the hard material, is provided, it is possible to provide a coating formed of an effective hard material.

Furthermore, according to a tenth invention, a rotating/rotatable member is provided having an abrasive coating film formed on a part thereof that is formed by a pulsed discharge between the rotating/rotatable member and a discharge electrode of a green compact in dielectric liquid or gas, wherein the green compact includes a hard material or a material that changes into a hard material by the discharge, and the abrasive coating film includes the hard material of the green compact or the hard material that is changed from the material of the green compact by the discharge. The rotating/rotatable member is characterized in that the pretreatments, such as a masking or a blast process, or the post-treatments, such as grinding, are not necessary and the coating film or the layer having good adhesion is formed. Furthermore, the coating film is preferably formed on the tip end of the rotating/rotatable member.

For the rotating/rotatable member, the discharge is caused between the rotating/rotatable member and the discharge electrode in the dielectric liquid or gas to form an abrasive coating film, including hard material, on a part of the rotating/rotatable member so that the rotating/rotatable member is formed to be superior in abrasive properties.

According to the eleventh to fourteenth inventions, because the coating film having ductility is formed, the layer for preventing development of cracks is formed between the mother material and the coating film, and the coating layer, which is strong against pull forces, is formed so that the rotating member is provided with high fatigue strength.

Moreover, according to a fifteenth invention, a remarkably hard ceramic, usable in the coating of the hard material, is provided and, accordingly, the rotating/rotatable member is provided with good abrasive properties.

To achieve the second object, according to a 16th invention, there is provided a rotating/rotatable member wherein only the vicinity of a portion of the rotating/rotatable member that has a possibility of coming into contact with a component disposed opposite to the rotating/rotatable member is coated with hard material. Accordingly, a rotating/rotatable member is obtained that requires little in labor of operation, is small in the amount of electrode use, exhibits a good yield of products, and that is low in cost.

In accordance with a 17th invention, there is provided a further inexpensive rotating/rotatable member wherein the range of area to be coated is locally limited.

In accordance with an 18th invention, a rotating/rotatable member is provided that is coated in a method for enhancing the abrasive properties of the tenth to 17th inventions. The rotating/rotatable member is coated under conditions for forming a coarse surface roughness in order to enhance the abrasive properties of the coated rotating member.

A 19th invention provides a concrete example of the 16th invention, wherein there is provided a blade whose tip end is coated with hard material. Only a corner of the blade in a rotation advance direction and a portion in the vicinity of the corner are coated with the hard material. Because the range of the coating of the hard material is optimized, the yield is improved, the operation time is shortened, and the coating material can be coated efficiently without waste.

A 20th invention provides a concrete example of the 17th invention, wherein a rotating/rotatable member is provided in which the coating film is formed on not all, but some of the blades of a rotor or a blisk. By minimizing the number of coated blades, the operation time is reduced and coating material can be coated even more efficiently with even less waste.

To achieve a third object, in accordance with a 21st invention, the rotating/rotatable member is a rotating/rotatable labyrinth seal component that is one of the structure elements of a labyrinth seal structure that suppresses leak of a gas or liquid between a stationary component and a rotating component. The rotating/rotatable member comprises an annular seal component main body, and an annular seal fin integrally formed on an outer peripheral surface of the seal component main body, and a tip edge of the seal fin is coated with hard material. For forming a coat of the hard material, an electrode for coating having consumability is used, a pulsed discharge is caused between the electrode for coating and the tip edge of the seal fin in dielectric liquid or gas, and the coat includes the hard material formed of a constituting material of the electrode for coating formed on the tip edge of the seal fin by discharge energy or of a reactant of the constituting material.

In this disclosure, in general, the phrase "electrode for coating having consumability" means a green compact electrode (including a thermally treated green compact electrode) obtained by compression molding of a powdered metal (including a metal compound), a mixed material of the powdered metal and a powdered ceramic, or a powdered ceramic having conductivity. Furthermore, the phrase "electrode for coating having consumability" also means a silicon electrode formed of solid silicon. It is to be noted that, in accordance with the present invention, the ceramic having conductivity is appropriately subjected to a surface treatment.

According to a 21st invention, the coat of hard material is a coating film including a hard material constituted of the constituting material of the electrode for coating, or a reactant of the constituting material, formed on the tip edge of the seal fin by discharge energy generated between the electrode for coating and the tip edge of the seal fin without performing plating or thermal spraying. Therefore, during production of the rotating/rotatable labyrinth seal component, coating pretreatments, such as a blast treatment and a process of attaching a masking tape, and coating post-treatments, such as a process of removing the masking tape, are unnecessary. Moreover, because a boundary portion between the coat of the hard material coated by discharge energy and a mother body of the seal fin has alloy composition gradient properties (i.e., alloy composition changes depending on the position, also referred to as a "composition gradient alloy"), the coat of hard material can be firmly connected to the tip edge of the seal fin. In other words, the boundary portion is a composition gradient alloy including hard material and material of the mother body, wherein the composition of the composition gradient alloy of the boundary portion varies depending on position in the boundary portion (i.e., whether at the hard material side of the boundary portion or whether at the mother body side of the boundary portion).

Furthermore, in accordance with the 21st invention, preferably as in the 22nd invention, the coat of hard material includes a plurality of local coating films locally formed on a plurality of portions in a peripheral direction to the tip edge of the seal fin. By this constitution, the coat of hard material includes a plurality of local coats. In other words, the coating film including hard material constituted of the constituting material of the electrode for coating, or the reactant of the constituting material, is locally formed on a plurality of portions of the peripheral direction in the tip edge of the seal fin, but not in the whole periphery of the tip edge of the seal fin. Therefore, the electrode for coating can be formed in a small and simple shape in accordance with the size or the shape of the portion to be treated of the tip edge of the seal fin. Moreover, the amount of electrode material used from the electrode for coating can be reduced.

It is to be noted that, as described above, because the coat of hard material (i.e., the local coat of hard material) can be connected firmly to the tip edge of the seal fin, the entire rotating/rotatable labyrinth seal component can be provided with sufficient abrasive properties by just the local coat of the plurality of hard materials without having to coat the whole periphery of the tip edge of the seal fin with hard material.

Furthermore, in accordance with the tenth invention, preferably as in the 15th invention, the electrode for coating is the green compact electrode obtained by compression molding of powdered metal, the mixed material of the powdered metal and the powdered ceramic, or the powdered ceramic having conductivity, or the solid silicon electrode. Furthermore, the ceramic is one of, or a mixture of, cBN, $Cr_3C_2$, TiC, TiN, $TiAlN$, $TiB_2$, $ZrO_2$—Y, ZrC, VC, $B_4C$, WC, SiC, $Si_3N_4$, and $Al_2O_3$.

In accordance with this disclosure, the "powdered metal" also includes a powdered metal compound. It is to be noted that, in accordance with the present invention, a ceramic that does not have conductivity may be appropriately subjected to a surface treatment so as to secure conductivity.

Moreover, in accordance with a 23rd invention, there is provided a labyrinth seal structure that suppresses a leakage of a gas or liquid between a stationary component and a rotating component, comprising: a stationary-side seal component integrally disposed on the stationary component; an annular seal component main body that is disposed inside the stationary-side seal component and that is capable of rotating integrally with the rotating/rotatable component and which is integrally disposed on the rotating/rotatable component; an annular seal fin integrally formed on an outer peripheral surface of the seal component main body; and a hard coat formed on the tip edge of the seal fin, wherein the hard coat is a coating film including a hard material constituted of a constituting material, or a reactant of the constituting material, of an electrode for coating formed on the tip edge of the seal fin by discharge energy of a pulsed discharge between the electrode for coating and the tip edge of the seal fin, and the electrode for coating has consumability.

In this disclosure, the phrase "stationary-side seal component" includes a honeycomb-shaped stationary honeycomb seal component, or a stationary abradable seal component whose inside is coated with an abradable coat. Moreover, in general, the phrase "electrode for coating having consumability" means a green compact electrode (including a thermally treated green compact electrode) obtained by compression molding of a powdered metal (including a metal compound), a mixed material of a powdered metal and a powdered ceramic, or a powdered ceramic having conductivity. Furthermore, the phrase "electrode for coating having consumability" also means a silicon electrode formed of solid silicon. It is to be noted that for ceramic that does not have conductivity, the surface of a ceramic powder that does not have conductivity is then subjected to a treatment for forming a conductive coating film so as to appropriately secure conductivity for the ceramic powder.

According to the 23rd invention, the rotating/rotatable labyrinth seal component includes a coat of hard material. Therefore, when integrally rotating the rotating/rotatable labyrinth seal component with the rotating/rotatable component, even when the stationary-side seal component is deformed, when the rotating/rotatable labyrinth seal component contacts the stationary-side seal component, the stationary-side seal component is simply shaved by the coat of hard material in the rotating/rotatable labyrinth seal component, whereas the rotating/rotatable labyrinth seal component is hardly shaved at all.

Accordingly, the clearance between the stationary-side seal and the rotating/rotatable labyrinth seal component is inhibited from increasing during rotation of the rotating/rotatable component, and the seal effect of the labyrinth seal structure can be kept in an appropriate state. Moreover, the rotating/rotatable labyrinth seal component is set so as to slightly contact with the stationary-side seal component during initial rotation of the rotating/rotatable component. Accordingly, during or after the initial rotation, the clearance between the stationary-side seal component and the rotating/rotatable labyrinth seal component can be reduced as much as possible, and the seal effect of the labyrinth seal structure can be further enhanced.

Moreover, the coat of hard material is the coating film, including the hard material constituted of the constituting material of the electrode for coating of or the reactant of the constituting material, that is formed on the tip edge of the seal fin by discharge energy generated between the electrode for coating and the tip edge of the seal fin without performing plating or thermal spraying. Therefore, during production of the rotating/rotatable labyrinth seal component, the coating pretreatments, such as the blast treatment and the process of attaching the masking tape, and the coating post-treatments, such as the process of removing the masking tape are, unnecessary. Furthermore, because the boundary portion between the coat of hard material coated by discharge energy and the mother material of the seal fin has alloy composition changing properties, the coat of hard material can be connected firmly to the tip edge of the seal fin.

Furthermore, in accordance with a 24th invention, preferably the coat of hard material includes a plurality of local coating films locally formed on a plurality of portions in the peripheral direction of the tip edge of the seal fin. By this constitution, the coat of hard material includes a plurality of local coats of hard material. In other words, the coating film, which includes hard material constituted of the constituting material of the electrode for coating or the reactant of the constituting material, is formed locally on a plurality of portions to be treated in the peripheral direction of the tip edge of the seal fin, and not in the whole periphery of the tip edge of the seal fin. Therefore, the electrode for coating can be formed into a small and simple shape in accordance with the size or shape of the portion to be treated in the tip edge of the seal fin. Moreover, the amount of the electrode material used by the electrode for coating can be reduced.

It is to be noted that, as described above, because the coat of the hard material (i.e., local coat of hard material) can be firmly connected to the tip edge of the seal fin, the entire rotating/rotatable labyrinth seal components can be provided with sufficient abrasive properties by local coats of the plurality of hard materials without coating the whole periphery of the tip edge of the seal fin with hard material.

In accordance with a 25th invention, there is provided a method for manufacturing a rotating/rotatable member of a blade or a labyrinth member, comprising: a first step of forming a forged material or a casted material into a predetermined shape by mechanical processing; and a second step of generating a pulsed discharge between a rotating/rotatable member formed into a predetermined shape and a discharge electrode of a green compact or solid silicon in dielectric liquid or gas in order to transfer hard material of the discharge electrode or hard material changed from a material of the discharge electrode onto the rotating/rotatable member by each discharge pulse so that a hard concavity and convexity is formed on the rotating/rotatable member, wherein the green compact includes the hard material or the material changing into the hard material by the discharge, and repeatedly generating the discharge pulse to form on the rotating/rotatable member a hard coating film having the concavity and convexity.

In accordance with a 26th invention, in the above-described manufacturing method, in the second step, an abrasive coating film, which rubs against and shaves an opponent component, is formed as the hard coating film on a part of the rotating/rotatable member.

In accordance with a 27th invention, there is provided a method for manufacturing the rotating/rotatable member, wherein the second step comprises the steps of forming a discharge electrode into a shape in accordance with the shape of a predetermined portion of the rotating/rotatable member.

In accordance with a 28th invention, there is provided a method for providing discharge conditions so that the shape of the discharge electrode conforms to that of the coating film forming portion of the rotating/rotatable member in order to form the electrode without any trouble.

In accordance with a 29th invention, there is provided a method for manufacturing the rotating/rotatable member so that the rotating/rotatable member does not easily collapse from fatigue, wherein during the formation of the coating film in the second step, a discharge condition is controlled to set a coverage to be 95% or less in the coating film forming portion, wherein the coverage is a ratio of an area at which the coating film including the hard material is formed.

In accordance with a 30th invention, there is provided a method of manufacturing the rotating/rotatable member, wherein the ratio of the coverage is controlled to provide the rotating/rotatable member with the characteristic does not easily collapse from fatigue.

In accordance with a 31st invention, there is provided, a method for manufacturing the rotating/rotatable member so that the rotating/rotatable member does not easily collapse from fatigue, wherein in the second step, a green compact electrode containing 5% or more by volume of a metal that does not easily react into carbide is used to perform the discharge.

In accordance with a 32nd invention, there is provided a method for manufacturing the rotating/rotatable member so that the rotating/rotatable member does not easily collapse from fatigue, wherein the second step comprises the steps of: forming a porous coating film on a coating film forming portion of the rotating/rotatable member; and thereafter forming the coating film including the hard material on the porous coating film. In accordance with a 33rd invention, there is provided a method for manufacturing the rotating/rotatable member superior in abrasive properties by using the appropriate discharge electrode material of the green compact in the second step.

In accordance with a 34th invention, there is provided a method of manufacturing the rotating/rotatable member so that the rotating/rotatable member does not easily collapse from fatigue, further comprising: a third step of subjecting the coating film formed in the second step to a peening treatment.

Other objects and advantageous characteristics of the present invention will be apparent from the following description with reference to the accompanying drawings.

DESCRIPTION OF THE PREFERRED EMBODIMENT

Figure 1A:
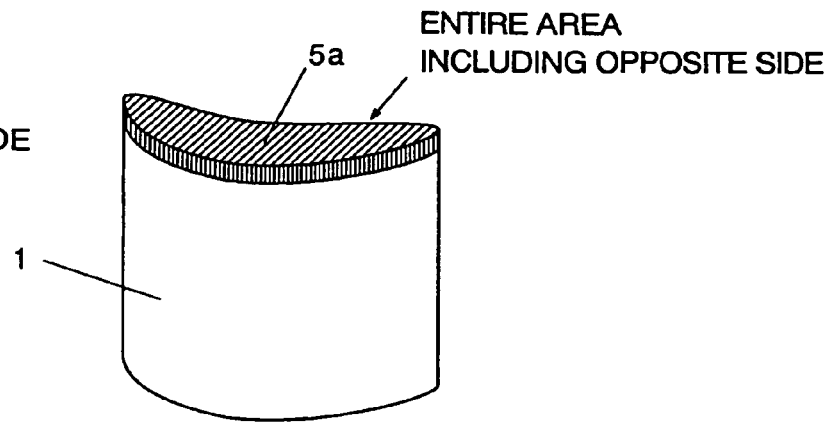
FIG. 1A is a perspective view of a typical turbine blade.
Figure 1B:
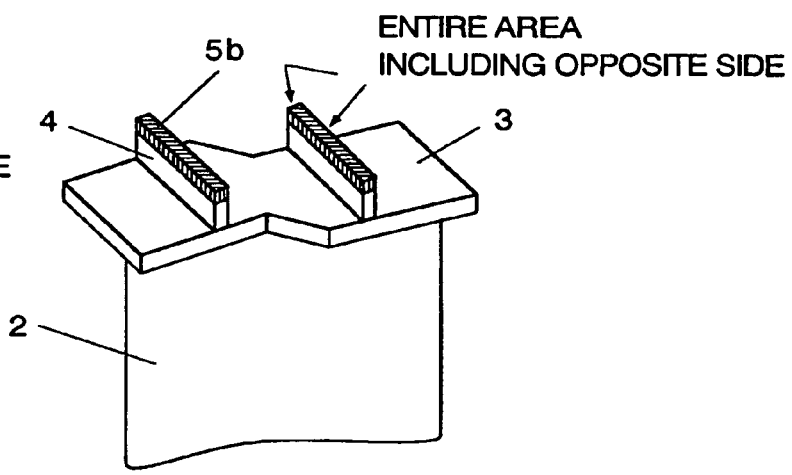
FIG. 1B is a perspective view of the turbine blade provided with a chip shroud.
Figure 1C:
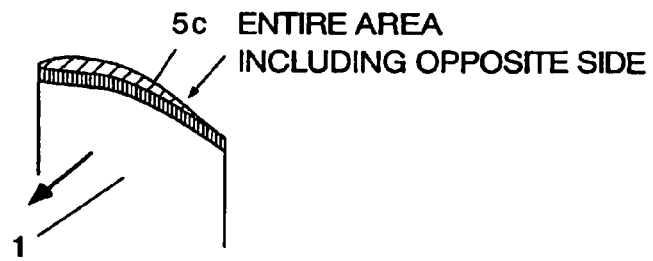
FIG. 1C is a perspective view of a compressor blade.
Figure 2:
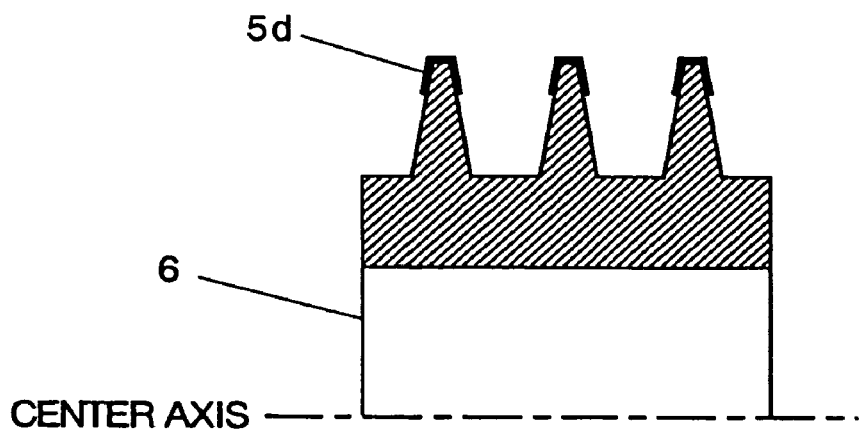
FIG. 2 is a perspective view showing one example of a conventional labyrinth seal tip end.

Preferable embodiments of the present invention will hereinafter be described with reference to the drawings. It is to be noted that components common to the respective drawings are denoted with the same reference numerals, and redundant description is omitted.

Figure 3:
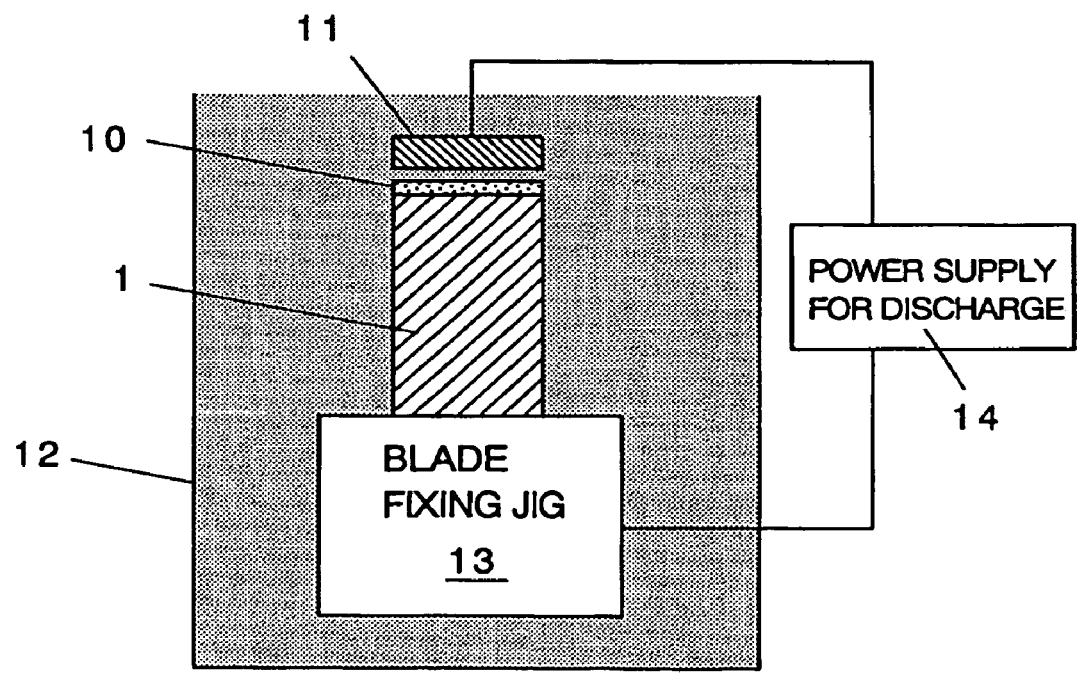
FIG. 3 is a diagram showing a first embodiment of a rotating/rotatable member and coating method of the present invention.

FIG. 3 is a diagram showing a first embodiment of a rotating/rotatable member and coating method of the present invention. This figure shows that the tip end of blade 1, for use in a gas turbine or a compressor, is coated with a hard material.

In the method of the present invention, as shown in FIG. 3, the blade 1 and a discharge electrode 11 that includes cubic boron nitride (cBN) are submerged in a processing tank 12 filled with dielectric liquid (oil). A pulsed discharge is caused between the tip end of the blade 1 and the discharge electrode 11 by a power supply for discharge 14 in order to melt the discharge electrode 11. A part of the electrode is consequently welded to the tip end of the blade 1 to form a cBN-containing coating film 10. In this case, only sections of the blade 1 and discharge electrode 11 are shown, however, the blade 1 is fixed by a blade fixing jig, and the discharge electrode 11 is fixed by an electrode fixing jig (not shown). It is to be noted that FIG. 3 shows an example of the blade, but a labyrinth seal, which is the same kind of rotating/rotatable member, can also be coated with hard material in accordance with a similar method. It is to be noted that, in the figure, reference numeral 13 denotes the blade fixing jig.

In accordance with the above description, cBN is used as a hard material, and cBN is a coating material optimum for a turbine blade that is exposed at a high temperature in that Vickers hardness is 4500 HV at room temperature, and Vickers hardness close to 2000 HV can be maintained even at high temperature of 900° C. or more. Additionally, from the viewpoint of resistance to oxidation, a hard material of TiC, WC can be used in those rotating members used at a low temperature, $Cr_3C_2$ can be used in those rotating members for use at a high temperature, and $ZrO_2$—Y or $Al_2O_3$ can be used in those rotating/rotatable members for use at an even further high temperature. Therefore, according to the present invention, a coating film containing TiC, WC, or cBN is formed on the rotating/rotatable member for use at low temperature, a coating film containing cBN or $Cr_3C_2$ is used in rotating/rotatable members for use at high temperature, and a coating film containing $ZrO_2$—Y or $Al_2O_3$ is formed on the rotating/rotatable member for use at even further high temperature. Needless to say, these hard materials may also be mixed together to form an optimum coating film. It is to be noted that a discharge coating technique is disclosed, for example, in "Surface Treatment Method of Metal Material by In-liquid Discharge" of Japanese Laid-Open Patent Publication No. 7-197275, and the description provided therein is omitted.

In accordance with the present invention, because ceramics, such as cBN are hard insulating materials, a single ceramic such as cBN cannot be formed into the discharge electrode, but the discharge electrode containing such ceramics (such as cBN) can be formed by use of a conductive binder. For example, Co-based alloy powder can be used as the conductive binder, and ceramic powder such as cBN may be mixed with the Co-based alloy powder, charged in a press mold, and compressed/molded. It is to be noted that the amount of binder is preferably about 50% or more by a volume ratio of the mixture.

Furthermore, a powder of ceramics, such as cBN, may be coated with titanium (Ti), nickel (Ni), or cobalt (Co), which is a binder used to form the discharge electrode. A particle diameter of the whole powder needs to be smaller than the pole distance between the electrode and the work undergoing the discharge surface treatment, and is, therefore, preferably about 10 μm or less. The powder of ceramics, such as cBN, can be easily coated with a thin coating film of Ti, Ni, or Co metal by vapor deposition.

When the conductive binder is mixed, and the discharge electrode containing ceramics, such as cBN, is formed in this manner, a discharge can be caused in a portion of the binder so that the discharge electrode is brought into a molten state by heat energy, and a part of the discharge electrode can then be welded/attached to the tip end of the rotating member, such as the blade. As a result, the tip end of the rotating/rotatable member can be coated with a hard coating film containing ceramics such as cBN.

Here, Table 1 shows results of a wear test in which two test pieces (upper and lower test pieces), wherein only the lower test piece is coated by the coating method of the present invention, are ground (rubbed) with each other at high temperature.

TABLE 1

|  | Coating material | Wear amount (μm) |
| --- | --- | --- |
| Upper test piece | Ni alloy | 600 or more |
| Lower test piece | cBN coating | 0 |

The upper test piece is RENE77, which is a nickel-based alloy, and the lower test piece is cBN, which is the coating film made in accordance with the present invention. For test conditions, the conditions employed were temperature: 800 degrees centigrade; surface pressure: 7 MPa; cycle number: $10^7$ cycles; and amplitude: 0.35 mm. As seen from Table 1, a wear amount of 600 μm or more is measured on the Ni alloy, but no wear is detected on the coating film of cBN. From this result, it is seen that cBN is superior in abrasive properties because it wore down the Ni alloy. It is to be noted that the Ni alloy of the upper test piece is an alloy constituted of a component ratio of Ni: 57%, Cr: 15%, Co: 15%, Mo: 5%, Ti: 3.5%, Al: 4.4, C: 0.1%.

When a so-called discharge coating method is used to coat the tip end of the rotating/rotatable member, such as the blade, with the coating film containing ceramics such as cBN, the hard coat can be applied easily by use of characteristics of the ceramics such as cBN, and a coating film, having good adhesion and quality level, can be coated as compared to conventional methods such as by welding and by thermal spraying. According to the present invention, because a thin coating film (or a layer) having a thickness of several microns to 30 μm can be formed, the coating film is not easily cracked, and precision of the thickness can be controlled by a unit of several μm. Therefore, it is possible to provide a coating method optimum for precision components, such as the blade and labyrinth seal.

Coarser surface roughness, corresponding to abrasive properties for shaving the opponent component to be ground, is preferable. In the above example, the surface roughness is coarser than 1.2 μmRa.

As described above, because the so-called discharge coating method is used in the present invention, pretreatments (such as the masking and blast process) are unnecessary, and a coating film having good adhesion can be easily and inexpensively formed. Furthermore, a coating film containing ceramics, such as cubic boron nitride (cBN), can be coated. Therefore, a portion of the rotating/rotatable member requiring abrasive properties can be coated with a hard coating film that is superior in abrasive properties.

A coating layer of the hard material is hard, but has little ductility. Therefore, a tensile stress applied to the component coated with the hard material is not borne by the mother material of the component when the component has a large ductility. Instead, the tensile stress is borne only by the coating layer of the surface, which coats the component. Therefore, the surface (i.e., the coating layer) cracks, and there is a possibility that the crack will develop into the mother material. To avoid this cracking, a method of imparting ductility to the otherwise hard coating layer is used.

Figure 4:
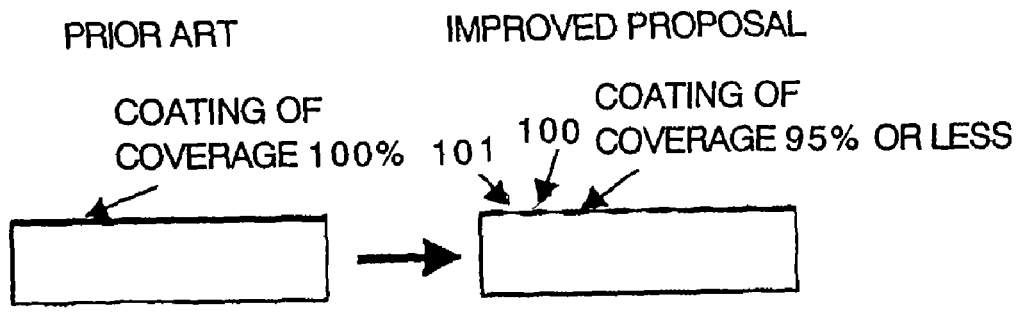
FIG. 4 is a diagram showing a second embodiment of the rotating/rotatable member and coating method of the present invention.

Table 2 shows the number of cycles reaching destruction in a high cycle fatigue (HCF) test in which an outer diameter of a round rod is coated with the hard material and a tensile load is going to be repeated in an axial direction. Without any coating of hard material, the round rod material does not break up to one million cycles. However, when a coating in which the ratio of coated area coated with hard material of the coating surface is 98% (that is, when the ratio of coverage of coated portions 100 to uncoated portions 101 of an area coated with the coating film is 98% of the coated surface (i.e., coated area)instead of 95% or less as shown in FIG. 4), the round rod material is observed to break at 20 thousand cycles. However, when the coverage is decreased to about 95%, as shown in Table 2, the round rod material does not break up to one million cycles.

TABLE 2

| Coating state | Cycle number of break |
| --- | --- |
| No coating | One million cycles |
| 98% coverage of TiC | 20 thousand cycles |
| 95% coverage of TiC | One million cycles |

HFC test conditions: 500° C., 650 MPa, pull of round rod having a diameter of 5 mm in axial direction at 30 Hz When the coverage of the coating is lowered to 95% or less, the abrasive properties of the whole coating surface are slightly sacrificed in order to increase the ductility of the coating surface. When the coverage is raised, ductility decreases as evident from Table 2, and fatigue strength drops. However, at 95% coverage, fatigue strength does not drop in a large manner (if at all), although the abrasive properties drop a little. In accordance with one method of the present invention for lowering the coverage, discharge time is reduced to a range in which complete discharge does not occur, and in this way the coverage can be reduced. The coating treatment is usually performed for a time of five minutes/square centimeter, but the time may be reduced to about 3.8 minutes/square centimeter.

A calculation equation is as follows:
Time for obtaining a coverage of 95%=time for obtaining a coverage of 98%*LOG(1−0.95)/LOG(1−0.98). A coverage of 98% is regarded as a coverage of 100% for the purpose of the calculation equation. To calculate the time from a time for obtaining a coverage of 50%, 0.98 in LOG(1−0.98) is changed to 0.5.

Figure 5:
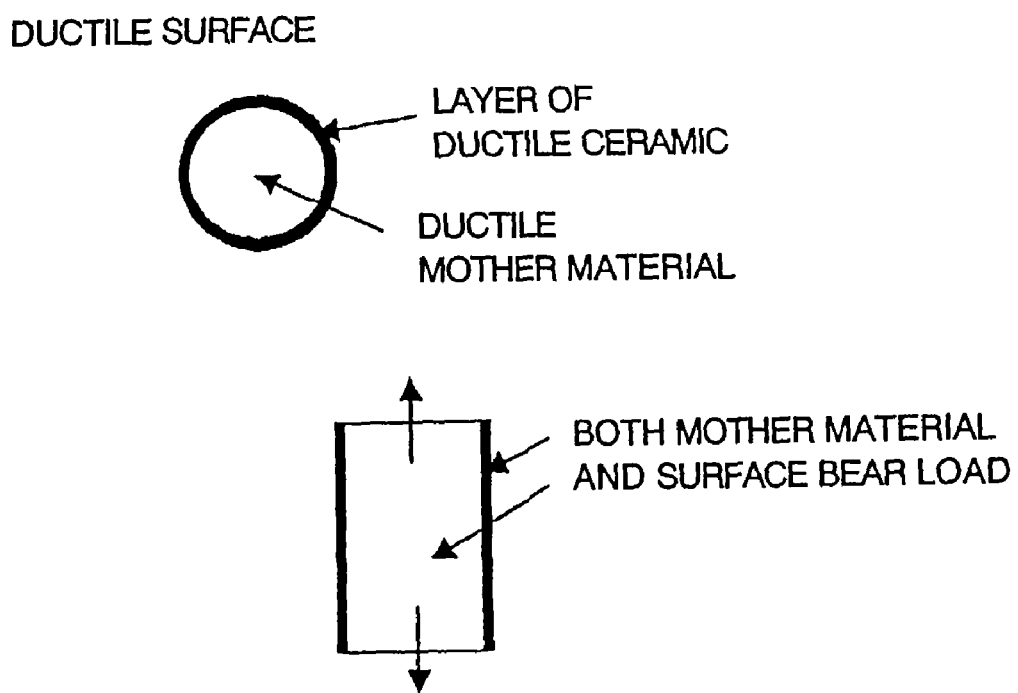
FIG. 5 is a diagram showing a third embodiment of the rotating/rotatable member and coating method of the present invention.

In another method, as shown in FIG. 5, by the use of an electrode to which metal powder, which is of a type that is not easily carbonized, is added, ductile properties of the metal may be imparted to the coating layer. When the electrode contains 5% or more of such a metal that is not easily carbonized, 5% or more of a portion having the ductility in the coating layer remains, and an effect similar to that of Table 2 can be expected. Also in this method, the abrasive properties of the whole coating surface are slightly sacrificed in order to enhance the ductility of the coating layer. Examples of metals that are not easily carbonized include cobalt, nickel, and iron. With respect to coverage, one blade has been described. However, there are a large number of blades in a turbine. Therefore, even if the coverage of the coating layer is low, or even if the abrasive properties are not observed in a certain portion of a certain blade, the other blades can cover the abrasive properties. This principle also applies to an annular seal because if one portion on the circumference of the annular seal has the abrasive properties, it is possible to obtain abrasive properties for the annular seal (See, e.g., FIG. 12).

Figure 6:
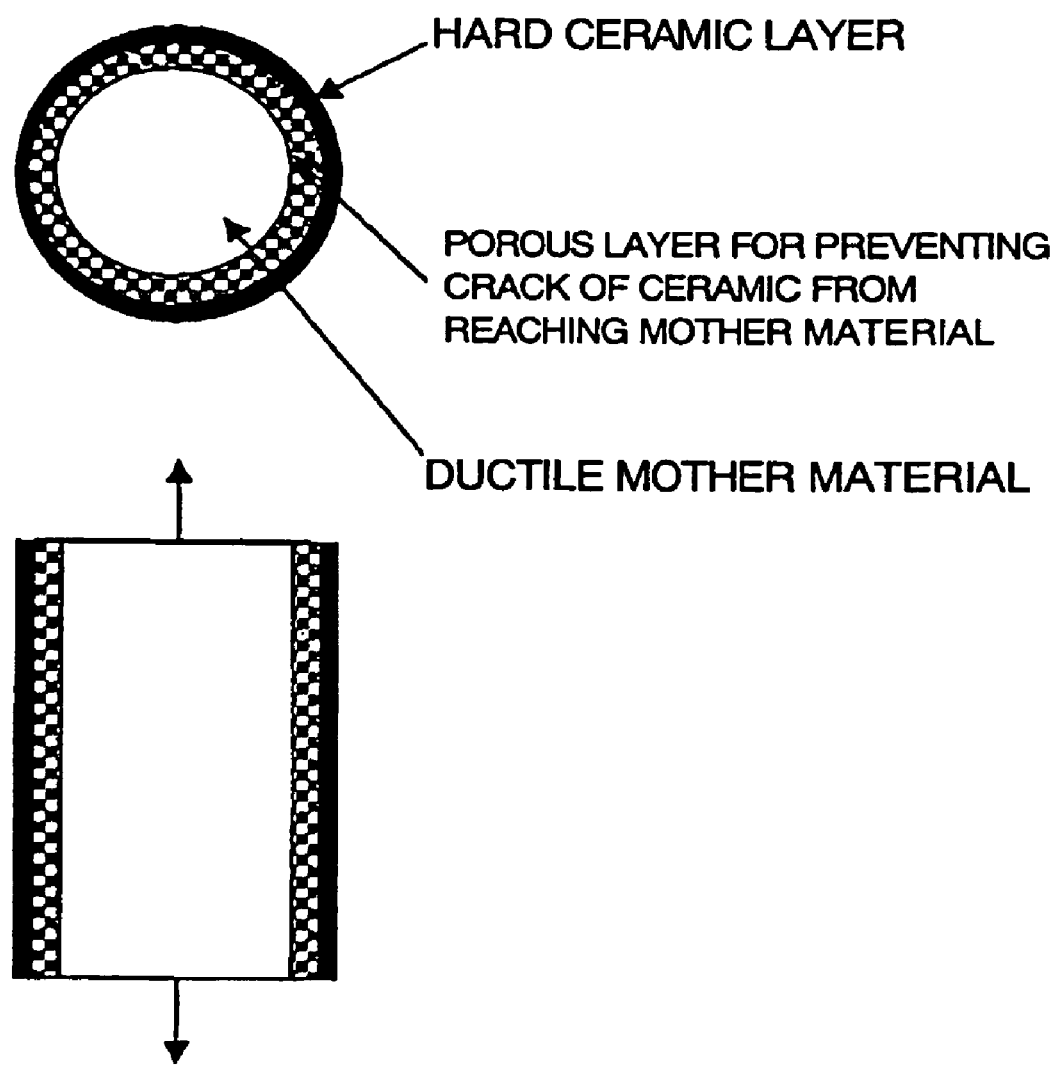
FIG. 6 is a diagram showing a fourth embodiment of the rotating/rotatable member and coating method of the present invention.

Moreover, as still another method of preventing cracking, as shown in FIG. 6, a porous layer is formed as a base for the coating layer of hard material in order to prevent the cracking of the coating layer from developing and then progressing into the mother material. The porous layer is formed as a base, and is disposed under the coating layer, which is formed on the porous layer. This base is also formed by discharge coating. The porous layer having a thickness of 0.05 mm or more can be formed by using a second electrode obtained by compression molding of a powder of metals such as Stellite. Thereafter, the porous layer is coated with hard material.

Moreover, the surface of the coating of the hard material is peened so that the surface is accordingly stretched, and compression stress remains so that tensile stress is reduced even when the mother material is elongated. The fatigue strength can thus be enhanced by the effect of peening. FIGS. 7A to 7C, 8A to 8C, 9A and 9B are perspective views showing fifth to seventh embodiments of the rotating/rotatable member of the present invention. It is to be noted that in these figures, a platform or a dovetail on a disk side is omitted from the drawings.

Figure 7A:
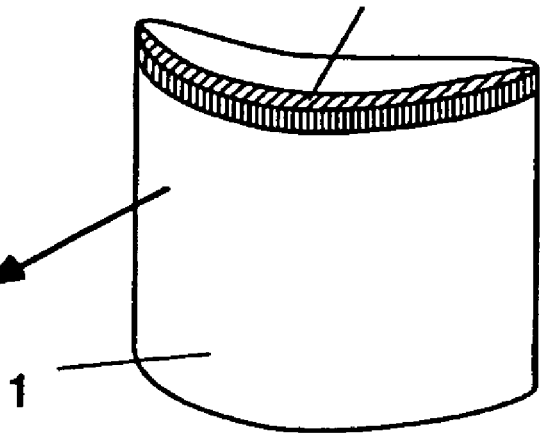
FIGS. 7A, 7B, and 7C are perspective views of the turbine blade according to a fifth embodiment of the rotating/rotatable member of the present invention.

In the turbine blade 1 of FIG. 7A, the corner of the blade in a rotation advance direction (that is, the blade tip end of the blade surface on the back side), and a tip end surface are coated with a coating 20 of hard material. In a thin turbine blade of FIG. 7B, the blade tip end of the blade surface on the back side and the entire tip end surface are coated, and the opposite surface may not be coated. In the turbine blade of FIG. 7C, the blade tip end of the blade surface on the back side is coated, and the entire tip end surface is not coated.

Figure 8A:
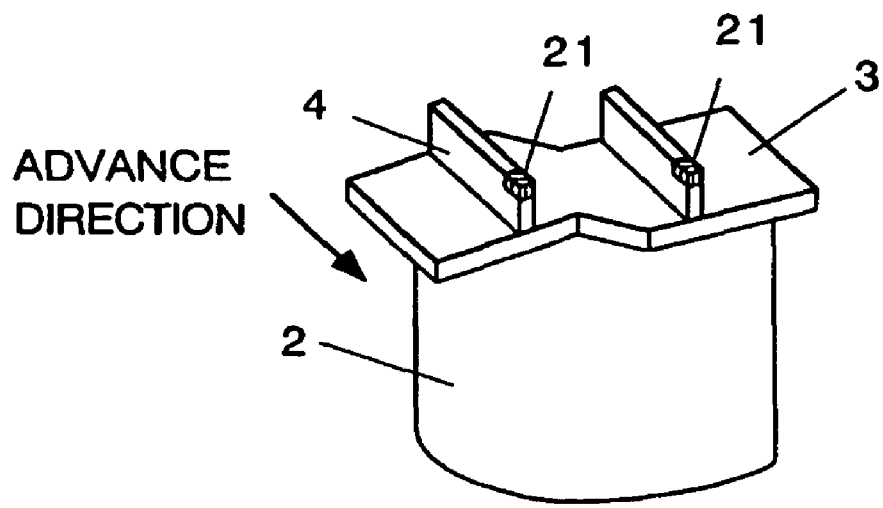
FIGS. 8A, 8B, and 8C are perspective views of the turbine blade provided with a chip shroud according to a sixth embodiment of the rotating/rotatable member of the present invention.

In the turbine blade 2 provided with a chip shroud, as shown by FIG. 8A, the corner of the tip end of a chip fin 4 in the rotation advance direction, or the surface of the chip fin 4 in the rotation advance direction (that is, the backside surface of the tip end of the chip fin 4) are coated with a coating 21 of hard material. It is to be noted that the chip shroud 3 is disposed to prevent resonance of the blades 2 at the time of high-speed rotation of the gas turbine and to prevent a high-temperature gas from leaking to the outside of the blades 2.

Figure 8B:
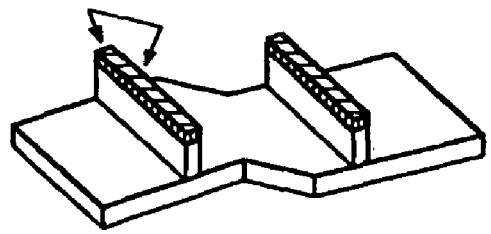

For a small blade, as shown by FIG. 8B, the entire surface of the tip end and the surface of the rotation advance direction (i.e., on the backside surface of the tip end of the chip fin 4) are coated, and the opposite surface may not be coated. In the turbine blade of FIG. 8C, the surface of the rotation advance direction (i.e., the backside surface of the tip end) is coated, and the whole surface of the tip end is not coated.

Figure 9A:
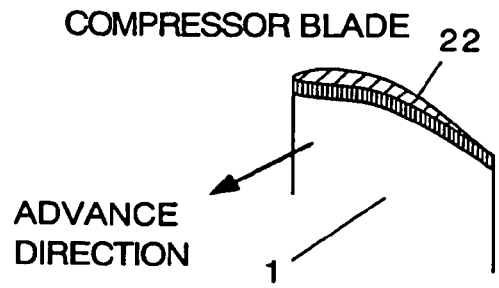
FIGS. 9A, and 9B, are perspective views of the compressor blade according to a seventh embodiment of the rotating/rotatable member of the present invention.

In the compressor blade 1 of FIG. 9A, the corner of the blade in the rotation advance direction (that is, the blade tip end of a blade surface on the front side) and the tip end surface are coated with a coating 22 of hard material. In the compressor blade of FIG. 9B, the surface of the rotation advance direction (that is, the blade tip end of a blade surface on the front side is coated), and the entire surface of the tip end is not coated.

Figure 9B:
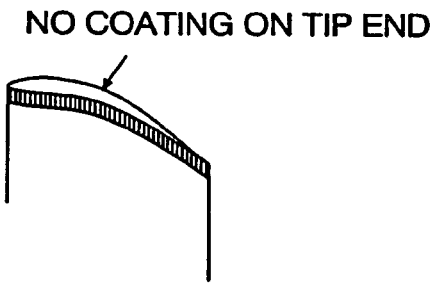

In the blades of FIGS. 9A and 9B, an abrasive property test was carried out by simulation of an actual device wherein, a difference was not observed in the abrasive property. As described above, the coating of hard material is applied so as to shave the abradable coating of the opposite component by using the tip ends of the blades 1, 2 thereby taking advantage of the hardness difference, at the time of driving the blades 1, 2, to maintain a minimum chip clearance. The abradable coating is applied on the casing or the shroud (i.e., opposite components). Moreover, this phenomenon starts by contact occurring between the casing, or the shroud, and the corners of the blades 1, 2 in the rotation advance direction, and the phenomenon ends when the casing or the shroud is shaved by the corners of the blades 1, 2. That is, after contact of the corner with the casing or shroud, another portion of the same blade hardly contacts the casing or the shroud. In consideration of this fact, the coating of hard material does not have to be applied over the entire region of the blade tip end as in the related art discussed above. As described in accordance with the present invention, it is sufficient that only a range of contact with the abradable coating (that is, only the corner of the rotation advance direction, or only the surface of the rotation advance direction of the blade that contracts the casing or shroud) is coated with coatings 20, 21, 22 of hard material. When the range of the portion of the blade to be coated is optimized in this manner, the range to be coated is narrowed, so the yield of products is increased, the operation time can be shortened, expensive coating material can be saved instead of wasted, and cost can be reduced.

Figure 7B:
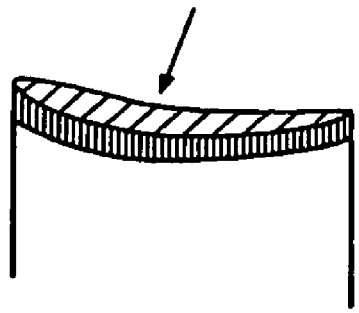
Figure 7C:
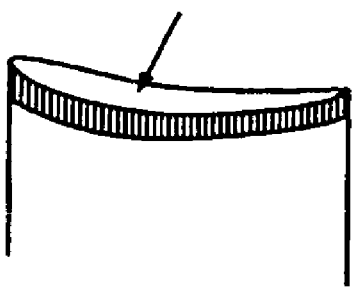
Figure 10:
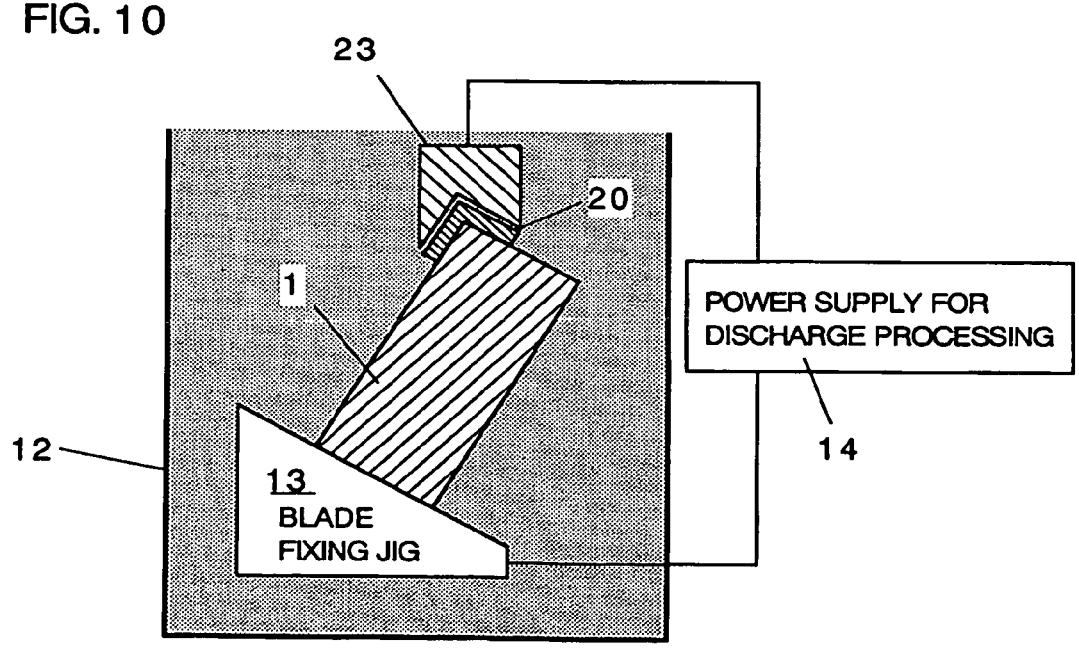
FIG. 10 is a diagram showing the fifth embodiment of the coating method according to the present invention.

FIG. 10 is a diagram showing a fifth embodiment of the coating method according to the present invention, and is a diagram showing the coating method of the blades shown in FIGS. 7A to 7C. In the coating method of the present invention, the blade 1 and a discharge electrode 23 are submerged in the processing tank 12 filled with the dielectric liquid (oil), the discharge electrode 23 is disposed in the vicinity of the corner in the rotation advance direction of the blade 1, a discharge is caused between them, and only the corner of the blade 1 in the rotation advance direction is coated with the coating 20 of hard material.

The coating 20 of hard material is formed to have a very thin thickness of 10 to 20 μm (exaggerated in the figure for ease of seeing the coating 20 in the figure). Therefore, after molding the blade 1 as usual, it is sufficient to apply the coating 20 of hard material only to a portion of contact with the opposite member (that is, only the corner of the rotation advance direction or the surface of the rotation advance direction). Needless to say, the corner of the blade 1 is shaved by the thickness of the coating 20 of hard material by machine processing, and a casting mold taking into consideration beforehand the thickness of the coating 20 may be used to mold the blade 1.

Moreover, in the case of a thin blade, the coating of hard material may be formed entirely on the rotation advance direction surface and on the tip end surface. However, the surface disposed opposite to the rotation advance direction surface does not have to be coated.

It is to be noted that only the sections of the blade 1 and discharge electrode 23 are shown in FIG. 10. In accordance with this coating method of the present invention, a discharge electrode 23 shaped so as to coat only the blade tip end of the blade surface on the back side and on the tip end surface is preferably used so that only the corner of the blade 1 in the rotation advance direction is subjected to the discharge coating. For example, the discharge electrode 23 has a substantially L-shaped section, and a shape curved along the back side of the blade as shown in FIG. 10.

The electrode may be processed beforehand into a product shape. However, alternatively, the electrode may be formed in accordance with the product shape by discharge on the discharge condition in which the electrode is easily consumed. Under this condition, the electrode is set to have a minus polarity, and the discharge is caused on a comparatively small energy condition on which the pulse width is set to 1 μs or less, and the current value is 10 A or less. In this way, damage of the product is suppressed, and the electrode can accord with the product shape. When the coating film is formed, the electrode is assumed to have the minus polarity, and the discharge is caused under a comparatively large energy condition in which the pulse width is about 2 to 10 μs, and the current value is about 5 to 20 A.

Figure 8C:
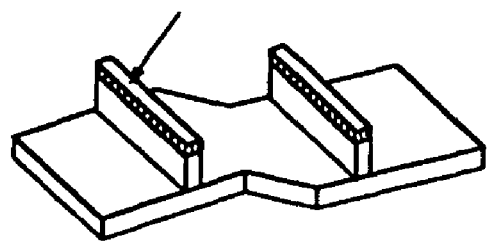

It is to be noted that although not shown, for the turbine blade provided with the chip shroud 2, as shown in FIGS. 8A to 8C, such an electrode may be used to coat the corner of the chip fin 4 in the rotation advance direction.

In discharge coating, the discharge is caused on the surfaces disposed opposite to each other by application of a voltage between the blade 1 and the discharge electrode 23 submerged in dielectric liquid. Consequently, the surface of the discharge electrode 23 is molten by the discharge, and the molten element is attached on the surface of the blade 1 to form the alloy on the surface. A solidified coating material is used for the material of the discharge electrode 23.

Because the thickness of the coating can be controlled to the degree of several micrometers, discharge coating is a coating method optimum for coating precision components such as the blade 1. Moreover, those places where the discharge does not occur are not coated. Therefore, because the portion to be coated can be coated locally, the pretreatments (such as masking) are unnecessary. Because heat generation is small, the blade is not thermally deformed, and consequently post-treatment is also unnecessary.

As described above, in accordance with the present invention, because the coating range of the hard material is optimized, the yield of products can be enhanced. Because operation time can be shortened, and the coating material can be used without waste, the cost of production can be reduced. Furthermore, because the so-called discharge coating is used, only the corner of the rotation advance direction of the blade, or the surface of the rotation advance direction, is easily and inexpensively coated with the hard material.

Moreover, even when all of the blades assembled onto a rotor are not coated with the hard material, as long as some of the blades are coated with the hard material, then it is still possible to obtain the effect as if all of the blades were coated. This principle also applies to the annular seal as long as one or more portions on the circumference of the annular seal have the abrasive properties.

Figure 11:
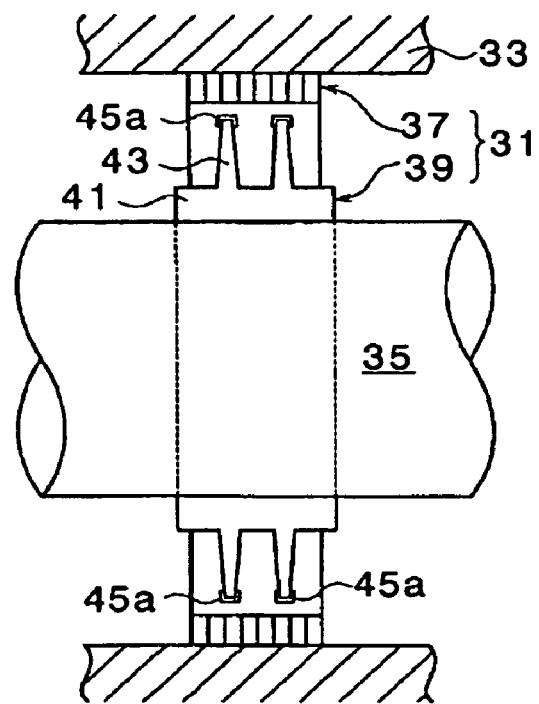
FIG. 11 is a schematic diagram of a labyrinth seal structure according to an eighth embodiment of the rotating/rotatable member of the present invention.
Figure 12:
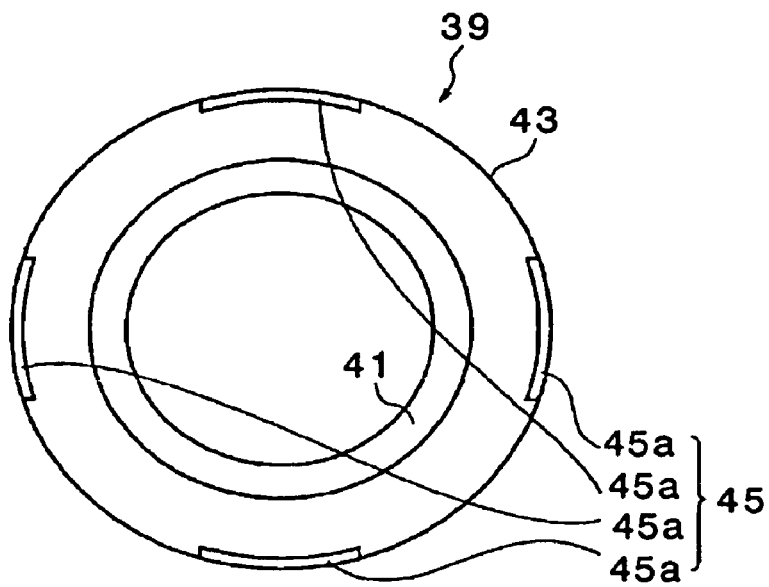
FIG. 12 is a front view of a labyrinth seal of FIG. 11.
Figure 13:
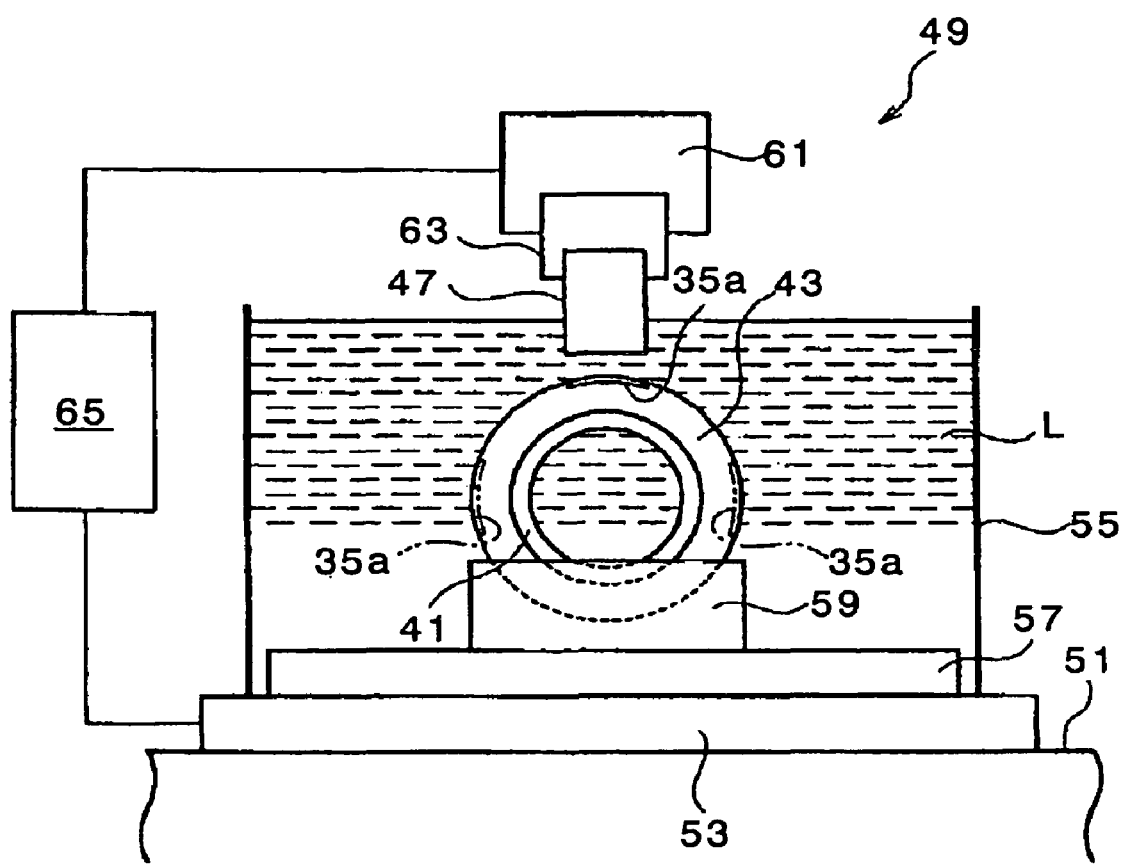
FIG. 13 is a schematic diagram of a discharge processing machine according to the eighth embodiment of the coating method according to the present invention.
Figure 13:
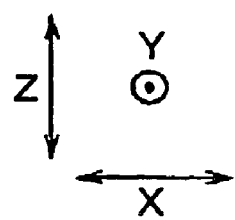

FIG. 11 is a schematic diagram of a labyrinth seal structure according to an eighth embodiment of the rotating member of the present invention, and FIG. 12 is a front view of the labyrinth seal of FIG. 11. FIG. 13 is a schematic diagram of a discharge processing machine according to the eighth embodiment of the coating method according to the present invention.

As shown in FIGS. 11 and 12, a labyrinth seal structure 31, according to an embodiment of the present invention, is used in the gas turbine of a jet engine and inhibits a leak of combustion gas between an engine stationary component 33 and an engine rotating component 35. The labyrinth seal structure 31 includes, as constituting elements, a honeycomb-shaped stationary-side honeycomb seal component 37 integrally disposed on the engine stationary component 33, and a rotating/rotatable labyrinth seal component 39 disposed inside the stationary-side honeycomb seal component 37 and capable of rotating integrally with the engine rotating component 35. It is to be noted that a stationary-side abradable seal component, whose inside is coated with the abradable coat, may also be used instead of the stationary-side honeycomb seal component 37.

A concrete example of the rotating/rotatable labyrinth seal component 39, which is an important part of an embodiment of the present invention, is as follows. Specifically, an annular seal component main body 41, which is a main body of the rotating/rotatable labyrinth seal component 39, is integrally disposed on the engine rotating component 35, and a plurality of annular seal fins 43 are integrally formed on the outer peripheral surface of the seal component main body 41. Tip edges of the respective seal fins 43 are coated with coats 45 of the hard material. Furthermore, for forming each coat 45 of hard material, an electrode 47 for coating having consumability (see FIG. 13) is used, and a pulsed discharge is caused between the electrode 47 for coating and the tip edge of the seal fin 43. The constituting material of the electrode 47 for coating, or the reactant of the constituting material, forms into the coating film containing the hard material on a plurality of treated portions in the tip edges of the seal fins 43 due to the discharge energy. Accordingly, a plurality of (four in the embodiment of the present invention) local coats 45a of hard material are applied at equal intervals.

In this disclosure, in accordance with the embodiments of the present invention, in general, the phrase "the electrode for coating having consumability" means a green compact electrode (including a thermally treated green compact electrode) obtained by compression molding of a powdered metal (including a metal compound), a mixed material of the powdered metal and a powdered ceramic, or the powdered ceramic having conductivity. The phrase "the electrode for coating having consumability" may also mean a silicon electrode formed of solid silicon. It is to be noted that ceramic having conductivity may be subjected to a surface treatment for forming a conductive coating film on the ceramic powder, and molded by compression, so that conductivity is secured. Especially, examples of the "powdered metal" include Ti, Co, and the like, and examples of the "powdered ceramic" include cBN, TiC, TiN, TiAlN, AlN, $TiB_2$, WC, $Cr_3C_2$, SiC, ZrC, VC, $B_4C$, $Si_3N_4$, $ZrO_2$—Y, $Al_2O_3$, and the like in accordance with the present invention.

The examples of the material that reacts by discharge energy to form the coating film containing hard material include Ti, W, Cr, Zr, Si, V, Mo, Nb. Furthermore, the electrode 47 for coating has a shape approximate to that of the portion to be treated in the tip edges of the seal fins 43.

Next, a concrete example of a discharge processing machine 49, for use in coating the coat 45 of hard material, and a coating method for coating the coat 45 of hard material will be described with reference to FIG. 13. Specifically, in a discharge processing machine 49, according to an embodiment of the present invention, a bed 51 is used as the processing machine base, and a table 53 is disposed on the bed 51. The table 53 can be moved in X-axis directions (i.e., left and right directions shown in FIG. 13) by driving an X-axis servo motor (not shown), and can be moved in Y-axis directions i.e., front and back directions of a sheet surface of FIG. 13) by driving a Y-axis servo motor (not shown). A processing tank 55 in which dielectric liquid L (such as dielectric oil) is disposed on the table 53, and a support plate 57 is disposed in the processing tank 55. A support tool 59, to which the seal component main body 41 is fixed, is disposed on the support plate 57. A processing head 61 is disposed via a column (not shown) above the bed 51 (above in FIG. 13), and this processing head 61 can move in Z-axis directions (i.e., upward and downward shown directions in FIG. 13) by driving a Z-axis servo motor. Moreover, an electrode hold member 63 for holding the electrode 47 for coating is disposed on the processing head 61.

It is to be noted that the electrode hold member 63 and the support tool 59 are electrically connected to a power supply 65. Therefore, the seal component main body 41 is fixed by the support tool 59 in a state in which a portion of the tip edge of the seal fin 43 to be treated in the peripheral direction is directed right upwards in the processing tank 55. Next, the table 53 is moved in the X-axis and Y-axis directions (at least either one of these directions) by driving the X-axis and Y-axis servo motors. In this way, the position of the seal fin 43 is determined such that the portion of the tip end of the seal fin 43 to be treated faces the electrode 47 for coating. Moreover, the electrode 47 for coating is moved integrally with the processing head 61 in the Z-axis direction by driving the Z-axis servo motor, while a pulsed voltage is generated between the electrode 47 for coating and the portion of the tip end of the tip fin 43 to be treated in the dielectric liquid L. Accordingly, the electrode material of the electrode 47 for coating is locally diffused in, and/or welded to, the portion of the tip edge of the seal fin 43 to be treated by discharge energy, and the portion of the tip edge of one seal fin 43 to be treated can locally be coated with a local coat 45a of hard material.

Furthermore, when the table 53 is moved in the Y-axis directions by driving the Y-axis servo motor, the position of another seal fin 43 is determined such that the portion of the tip fin of the seal fin 43 to be treated faces the electrode 47 for coating. Then, as described above, the electrode material of the electrode for coating 47 is locally diffused in, and/or welded to, the portion of the tip edge of this seal fin 43 to be treated by discharge energy, and the portion of the tip edge of the seal fin 43 to be treated is locally coated with the local coat 45a of hard material.

After locally coating the portion of the tip edge of a plurality of the seal fins 43 to be treated with the local coat 45a of hard material, a similar operation is repeated. In this way, also other portions of the tip edges of a plurality of the seal fins 43 to be treated are also locally coated with the local coats 45a of hard material.

Next, the function of an embodiment of the present invention will be described. The rotating/rotatable labyrinth seal component 39 includes the coat 45 of hard material. Therefore, by integrally rotating the rotating/rotatable labyrinth seal component 39 and the engine rotating component 35, even when the engine stationary component is deformed and the rotating/rotatable labyrinth seal component 39 contacts with the stationary-side honeycomb seal component 37, the stationary-side honeycomb seal component 37 is only shaved by the coat 45 of hard material in the rotating labyrinth seal component 39. The rotating/rotatable labyrinth seal component 39 is substantially hardly shaved at all.

Accordingly, the clearance between the stationary-side honeycomb seal component 37 and the rotating/rotatable labyrinth seal component 39 is inhibited from increasing during rotation of the engine rotating component 35, and the seal effect of the labyrinth seal structure 31 can be kept in an appropriate state (i.e., optimized). The rotating/rotatable labyrinth seal component 39 is set beforehand so as to slightly contact the stationary-side honeycomb seal component 37 at the time of the initial rotation of the engine rotating component 35. Accordingly, the clearance between the stationary-side honeycomb seal component 37 and the rotating/rotatable labyrinth seal component 39 can be set to be as small as possible during, and after, the initial rotation and the seal effect of the labyrinth seal structure 31 can further be enhanced.

Moreover, coating of the coats 45 of hard material is performed on portions of the tip edges of the seal fins 43 by diffusing and/or welding electrode material of the electrode 47 for coating by discharge energy generated between the electrode for coating 47 and the portion of the tip edge of the seal fin 43, which is performed without performing plating or thermal spraying. Therefore, during production of the rotating/rotatable labyrinth seal component 39, the coating post-treatments (such as the blast treatment and the process of removing masking tape) are unnecessary.

Furthermore, the boundary portion between the coat 45 of hard material formed by discharge energy and the mother body of the seal fin 43 has alloy composition changing properties, and the coat of hard material can be firmly connected to the tip edge of the seal fin 43. Moreover, the coat 45 of hard material includes a plurality of local coats 45a of hard material. In other words, the electrode material 47 of the electrode for coating is locally diffused in, and/or welded to, a plurality of portions to be treated along the peripheral direction in the tip edge of the seal fin 43, but not along the whole periphery of the tip edge of the seal fin 43. Therefore, the electrode 47 for coating can be formed to have a small and simple shape in accordance with the size and/or the shape of the portion of the tip edge of the seal fin 43 to be treated. Accordingly, the amount of the electrode material used to form the electrode 47 for coating can be reduced.

It is to be noted that as described above, the coat 45 of hard material (i.e., local coat 45a of hard material) can be connected firmly to the tip edge of the seal fin 43. Therefore, even when the entire tip edge periphery of the seal fin 43 is not coated with the coat 45 of hard material, sufficient abrasive properties of the entire rotating/rotatable labyrinth seal component 39 can be achieved by the plurality of local coats 45a of hard material.

As described above, according to an embodiment of the present invention, during production of the rotating/rotatable labyrinth seal component 39, the coating pretreatments (such as the blast process and the process of attaching the masking tape), and the coating post-treatments (such as the process of removing the masking tape) are not required. Therefore, the operation time required for production of the rotating/rotatable labyrinth seal component 39 is reduced, and it is easy to enhance the productivity yield of the rotating/rotatable labyrinth seal components 39. Moreover, because the coat 45 of hard material can be connected firmly to the tip edge of the seal fin 43, the coat 45 of hard material does not easily peel off from the tip edge of the seal fin 43, and the quality level of the rotating labyrinth seal component 39 is stabilized.

Furthermore, the entire rotating/rotatable labyrinth seal component 39 has sufficient abrasive properties, and the electrode 47 for coating can be formed to have a small and simple shape in accordance with the size/shape of the portion to be treated of the tip edge in the seal fin 43. Moreover, the amount of the electrode material used to form the electrode for coating 47 can be reduced. Therefore, the production cost of the rotating/rotatable labyrinth seal component 39 can be reduced.

It is to be noted that the present invention is not limited to the description of the embodiments of the present invention. For example, instead of performing the discharge in the dielectric liquid L, the discharge can be performed in an electrically insulating gas. Thus, various modifications can be carried out within the scope of the present invention.

As described above, according to the present invention, during production of the rotating/rotatable labyrinth seal component, the coating pretreatments, such as the blast process and the process of attaching masking tape, and the coating post-treatments, such as the process of removing the masking tape, are not required. Therefore, operation time required for production of the rotating/rotatable labyrinth seal component is reduced, and it is easy to enhance the productivity yield of the rotating/rotatable labyrinth seal components. Moreover, because the coat of hard material can be firmly connected to the tip edge of the seal fin, the coat of hard material does not easily peel off from the tip edge of the seal fin, and the quality level of the labyrinth seal is stabilized.

Furthermore, in addition to the above-described effect, the entire rotating/rotatable labyrinth seal component has sufficient abrasive properties, and the electrode for coating can be formed to have a small and simple shape in accordance with the size/shape of the portion to be treated at the tip edge in the seal fin. Moreover, the amount of electrode material used to form the electrode for coating can be reduced. Therefore, the production cost for the rotating/rotatable labyrinth seal component can be reduced.

It is to be noted that some preferable embodiments of the present invention have been described, but it would be understood that the scope of the present invention is not limited to these embodiments. Conversely, the scope of the present invention includes all improvements, modifications, and equivalents included in the appended claims.

The method in which the electrode is formed by compression molding of powder using a press is described in the above. However, it is apparent that the method for forming the electrode is not limited to the compression molding as long as the electrode is formed by using powder. As a method for forming the electrode, there are a method that uses slip, a method that uses an MIM (Metal Injection Molding), a method that uses thermal spraying, a method that uses nano powder accompanying a jet stream, and the like. In the method that uses slip, powder is dispersed in a solvent, and the solution is put in a porous mold such as gypsum to remove the solvent so that the electrode can be molded. In the method that uses the MIM, a mixture of powder and binder is kneaded, and then injected into a heated mold. In the method that uses thermal spraying, heated powder is sprayed to combine a part of the sprayed powder, forming the electrode. These methods are different in a manner of forming the electrode, but a purpose of these methods is the same in terms of forming the electrode by using powder. In other words, when the combination of powder reaches a desired state, the combined powder can be then used as the electrode.

The invention claimed is:

1. A labyrinth seal structure that suppresses leakage of a gas or liquid between a stationary component and a rotating component, the labyrinth structure comprising:
    (a) a stationary-side seal component integrally disposed on the stationary component;
    (b) an annular seal component main body that is disposed inside the stationary-side seal component and that is capable of rotating integrally with the rotating component, wherein the annular seal component main body is integrally disposed on the rotating component;
    (c) an annular seal fin integrally formed on an outer peripheral surface of the seal component main body; and
    (d) a hard coat formed on a tip edge of the seal fin,
    wherein the hard coat is an abrasive coating film including a hard material comprising a first material, or a second material that is a reactant of the first material, of an electrode for coating, wherein the hard coat is formed on the tip edge of the seal fin by discharge energy of a pulsed discharge between the electrode for coating and the tip edge of the seal fin, wherein the electrode for coating has consumability, wherein
    a boundary portion is located between the hard coat and a mother body of the seal fin, and the boundary portion includes a composition gradient alloy, and wherein a ratio of coverage of coated portion to uncoated portion of area coated with the coating film on the tip edge of the seal fin is such that not more than 95% of the area coated is coated portion, wherein the uncoated portion of the area coated with the coating film is scattered within the coated portion of the area coated with the coating film.

2. The labyrinth seal structure according to claim 1, wherein on the tip edge of the seal fin, a plurality of areas are coated with the coating film, and the areas are arranged at intervals in a rotating direction of the rotating component.

3. The labyrinth seal structure according to claim 1, wherein the first material of the electrode is TiC, SiC or WC.

* * * * *